UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING SULFURIC ANHYDRID.

1,227,044.  Specification of Letters Patent.  Patented May 22, 1917.

No Drawing.  Application filed June 13, 1916. Serial No. 103,566.

*To all whom it may concern:*

Be it known that I, CARLETON ELLIS, a citizen of the United States, residing at Montclair, in the county of Essex and State of New Jersey, have invented certain new and useful Improvements in Processes of Making Sulfuric Anhydrid, of which the following is a specification.

This invention relates to a process for making sulfuric anhydrid and particularly fuming sulfuric acid or oleum, involving the oxidation of sulfur dioxid with oxygen or air to sulfur trioxid and relates especially to the use of certain compounds of certain heavy metals with chromic acid or cromium material as will be more particularly hereinafter described and claimed.

The standard catalytic material for the manufacture of sulfur trioxid by the contact process is platinum and not infrequently this material is difficult to secure in large quantities and also is very costly. Furthermore, it is very easily affected by arsenic and other bodies acting as catalyzer poisons. In the present invention a relatively cheap material is used as a catalytic agent and this material normally is of a character not so readily affected by arsenic and the like so that expense in operation is saved, while the initial cost of the catalytic material is low as compared with the cost of platinum heretofore generally used.

In its preferred embodiment my catalyzer consists of or includes compounds of the nature of chromate of tin and specifically stannic chromate or compounds of stannic tin with chromium oxid, or other heavy metals and acidic radicals of an analogous character may likewise be used in place of the foregoing or in conjunction therewith.

The catalyzer may be prepared by dissolving ten parts of ammonium bichromate in water and carefully neutralizing with dilute ammonia water until a solution is obtained which is no longer acid to litmus. Fifty parts of washed asbestos or other voluminous carrier are thoroughly impregnated with this solution and the mixture then either with or without drying, treated with a solution containing ten parts of stannic chlorid. This mixture is evaporated to dryness with constant stirring and ignited, until fumes of ammonium chlorid cease to be evolved.

The catalyzer may also be prepared by dissolving or incorporating six parts of chromic acid and 7.4 parts chlorid of tin (stannous or stannic) in one hundred parts of water. The solution is incorporated with fifty parts washed asbestos or the like and the asbestos dried and ignited until fumes of hydrochloric acid cease to be evolved.

The foregoing illustrations represent two types of procedure in the preparation of the catalyzer but it should be understood that modifications of a varied character may be made in the preparation of this material as for instance the use of a carrier or the method of purification after precipitation of the tin chromate may be omitted, or some other method employed.

In the preparation of the catalyzer, I preferably do not employ salts of chromic acid with the fixed alkalis, since the presence of even a small amount of fixed alkali in the finished catalyzer appears to considerably lower its catalytic efficiency, for the oxidation of sulfur dioxid to trioxid.

I call attention also, to the fact that the proportions above given correspond substantially to chemically equivalent proportions of tin and chromium compounds but in many instances I have employed various other proportions, with good results, and I have also employed other metals, such as antimony, lead, bismuth, cadmium, and the like (metals whose oxids are capable of absorbing relatively large amounts of sulful dioxid) in place of tin.

The catalyzer prepared as above, may be used by passing sulfur dioxid and oxygen, or gases containing these, through or in contact with a bed of the catalyst, at a temperature of about 800°–950° F., a good working range being 850–900° F., and in some cases the sulfur dioxid and oxygen may approach substantially combining proportions, without a considerable excess of free oxygen as has heretofore been generally employed.

As a source of sulfur dioxid, pyrite burner gases may be employed or sulfur dioxid obtained from the burning of sulfur. In any case, the gases should be freed as far as possible from dust so as not to clog the catalyzer chamber with dust particles but the absolute removal of arsenic and similar poisons is not required. This makes possible the application of the present process to the oxidation of sulfur dioxid in smelter smoke or fume without the employment of such expensive purification apparatus, thereby converting sulfur dioxid to the trioxid which is recovered as sulfuric acid, instead of allowing the dioxid to pass into the air and cause injury to vegetation. As these gases may carry 2 or 3% of sulfur dioxid, in many cases mingled with products of combustion, due regard should be had for such conditions.

It is preferable to have the gases fairly dry before entering the contact chamber and in any event more uniform results are obtained by maintaining the moisture content uniform.

While with platinum as the catalytic material it is preferable not to exceed eight per cent. or so of sulfur dioxid in the gas mixture with the present catalyzer good results can be obtained employing even as high as twelve per cent. of sulfur dioxid thereby reducing the amount of heat required to bring the gas mixture to the requisite temperature. On the other hand the present process may be carried out with a gas mixture containing 2 or 3% and upward.

Using a mixture containing 8 per cent. of sulfur dioxid admixed with air at a temperature of approximately 800° F., conversion to sulfur trioxid is eighty two to eighty four per cent. and by absorbing the sulfuric anhydrid so produced and passing the residual gases through a second mass of catalyzer the conversion is rendered more complete so that a total conversion of ninety two to ninety six per cent. is possible. Using about 6% of the dioxid, a conversion of 88-93% or thereabout has been obtained in long continued tests, by only one passage through the catalytic mass.

The heat of the sulfur burners may be employed in the heating operations required, as for example, in heating the gases after the first absorption with sulfuric acid so as to bring the temperature up to a point where they can be introduced into the second catalyzer chamber under good working conditions.

In using this catalyzer any of the standard forms of apparatus adapted for such catalytic treatment may be employed. The double absorption method set forth above enables a satisfactory degree of conversion to be obtained. If desired, any residual sulfur dioxid may be absorbed in alkali to form sulfite or bisulfite.

Various combinations may be made with the chromium catalyzer and other catalyzers, also with the chromium catalyzer and other catalyzers in any desired sequence, in the case of the double absorption method. For example pyrite cinder may be the catalyzer in the first treatment and tin chromate in the second treatment, or vice versa.

The extending material, asbestos or the like, may be omitted if desired, and the catalyzer may be made up into the form of porous blocks, plates or granules, or other suitable form.

While I have described in this specification the use of the tin compounds and oxy compounds of chromium in proportions different from those necessary to form tin chromate, I call attention to the fact that the use of these materials in such other proportions is not claimed herein, but is claimed in my co-pending application Serial Numbers 65,285 and 75,028, and catalysts of the general character herein described are not claimed in the present application, but are claimed in my copending application Serial #75,028 and in a joint application filed by myself and H. M. Weber, Serial Number 67,357.

This application is in part a continuation of my prior application #37,243 filed June 30, 1915, paragraphs 1, 2, 3, 4, 5, 6, 10, 11, 12, 13, 14, 15 and 16 (after the preamble) of this specification being continued from such prior case.

What I claim is:

1. The process of making sulfuric anhydrid which comprises passing a gaseous mixture containing sulfur dioxid and oxygen into contact with a compound of tin and chromic acid.

2. The process of making sulfuric anhydrid which comprises passing a mixture of sulfur dioxid and oxygen containing gas into contact with a compound containing tin and chromium at a temperature at which such compound exercises catalytic activity; whereby a substantial proportion of sulfur dioxid is converted to sulfuric anhydrid.

3. The process of making sulfuric anhydrid which comprises passing gases containing sulfur dioxid and oxygen into contact with a catalyzer comprising tin chromate.

4. The process of making sulfuric acid which comprises exposing a gaseous current containing sulfur dioxid and oxygen to the action of tin chromate at a temperature at which said chromate acts as a catalyst, in passing the products of reaction through sulfuric acid to absorb sulfuric anhydrid, in passing the residual gases through a second mass of tin chromate material in removing the sulfuric anhydrid formed in the residual gases.

5. The process of making sulfuric anhydrid which comprises passing a mixture containing free oxygen and sulfur dioxid into contact with tin chromate, in the absence of fixed alkalis.

6. The process of making sulfuric anhydrid which comprises passing a mixture containing sulfur dioxid and oxygen into contact with a heated compound containing tin and chromium, capable of acting as a catalyzer, said compound being substantially free from fixed alkali compounds.

7. The process of making sulfuric anhydrid which comprises passing gases containing surfur dioxid and oxygen into contact with a catalytic compound containing tin and chromium, without previous removal of arsenic from said gases, whereby sulfuric anhydrid is formed.

8. A process which comprises passing a gas mixture containing sulfur dioxid and oxygen, into contact with a catalyzer capable of causing a partial combination thereof, removing at least the major part of the so-formed sulfur trioxid, and passing the remaining gases in contact with a second catalyzer capable of converting a further portion of said gas mixture; at least one of said catalyzers containing tin and chromium in substantially combining proportions.

9. A process which comprises passing gases containing sulfur dioxid and oxygen in contact with a catalyzer mass comprising chromium and a metal whose oxid is capable of absorbing sulfur dioxid, both the chromium and the other metal being in an oxidized condition, and these being present in substantially combining proportions, said catalyzer being substantially free from fixed alkali compounds.

10. The process which comprises passing pyrites burner gases, without purification from arsenical impurities in contact with a catalyst comprising a compound containing tin and chromium in substantially combining proportions.

11. A process which comprises passing pyrites burner gases in contact with a tin chromate catalyzer, said catalyzer being free from traces of compounds of the fixed alkalis.

12. A process of making sulfur trioxid which comprises bringing a gas mixture containing sulfur dioxid and oxygen into contact with a catalyst comprising voluminous chromium oxid, without previous purification of said gas mixture from arsenical compounds.

13. A process which comprises bringing a gas mixture comprising sulfur dioxid and oxygen, in about the proportions represented by the formula $2SO_2 + O_2$, into contact with a catalyst comprising voluminous flaky oxid of chromium, without previous removal of arsenical impurities from said mixture.

14. A process which comprises bringing $SO_2$ and $O$ into contact with a catalyst comprising chromium oxid and a heavy metal oxid capable of absorbing $SO_2$, without previous removal of arsenical impurities from said gas.

15. In the manufacture of sulfuric anhydrid which comprises passing a gas mixture comprising sulfur dioxid and oxygen over a catalyzer comprising tin and chromium in an oxidized state, while at a temperature of about 800 to 950° F.

In testimony whereof I affix my signature.

CARLETON ELLIS.